US005463697A

United States Patent [19]

Toda et al.

[11] Patent Number: 5,463,697
[45] Date of Patent: Oct. 31, 1995

[54] APPARATUS FOR DETECTING AN EDGE OF AN IMAGE

[75] Inventors: Masataka Toda, Toyohashi; Hiroyuki Suganuma, Nagoya, both of Japan

[73] Assignee: Aisin Seiki Kabushiki Kaisha, Kariya, Japan

[21] Appl. No.: 101,734

[22] Filed: Aug. 4, 1993

[30] Foreign Application Priority Data

Aug. 4, 1992 [JP] Japan .................................. 4-208101

[51] Int. Cl.$^6$ ............................................. G06K 9/48
[52] U.S. Cl. ............................................. 382/199; 382/295
[58] Field of Search ............................. 382/22, 48, 55, 382/9; 358/453

[56] References Cited

U.S. PATENT DOCUMENTS

| | | | |
|---|---|---|---|
| 3,673,566 | 6/1972 | Reede | 382/55 |
| 4,115,762 | 9/1978 | Akiyama et al. | 382/48 |
| 4,163,212 | 7/1979 | Buerger et al. | 382/48 |
| 4,441,206 | 4/1984 | Kuniyoshi et al. | 382/48 |
| 4,922,332 | 5/1990 | Taniguchi et al. | 382/55 |
| 4,955,062 | 9/1990 | Terui | 382/48 |
| 5,068,908 | 11/1991 | Inoue et al. | 382/22 |
| 5,245,445 | 9/1993 | Fujisawa | 382/22 |

FOREIGN PATENT DOCUMENTS

| | | |
|---|---|---|
| 229878 | 1/1990 | Japan . |
| 229879 | 1/1990 | Japan . |

*Primary Examiner*—Yon J. Couso
*Attorney, Agent, or Firm*—Sughrue, Mion, Zinn, Macpaeak & Seas

[57] ABSTRACT

A method of processing an image takes a picture of an object by CCD camera, and calculates a center position of an edge of the image of the object formed on an image field to determine the size of the object. A differential between picture elements is formed from image data to detect an edge region. A differential for each picture element located with the edge region is converted into an edge existence width estimate which is centered about the associated picture element and into an edge probability estimate that that picture element is an edge center. These estimates are used to weight the x position of the respective picture element in the edge region. A center x position Ejcp of an assemblage of weighted positions of all the picture elements in the edge region is calculated and is defined to be the center of the edge region.

5 Claims, 7 Drawing Sheets

APPARATUS FOR DETECTING AN EDGE OF AN IMAGE

FIELD OF THE INVENTION

The invention relates to the detection of an edge of an object on an image such as an image formed by a television camera or an image formed by computer graphics in which image data is represented by the brightness of individual picture elements distributed in two dimensions x and y, in particular, to the art of detecting the center of an edge or line of an image with a resolution higher than the pitch of picture elements.

THE PRIOR ART

A method of determining the shape, the size or the like of an object by taking a picture of the object by means of a television camera, for example, an image processing by a computer, is a convenient non-contact process to take the measure of an object in real time and on-line basis. Japanese Laid-Open Patent Applications No. 29,878/1990 and No. 29,879/1990 disclose a technology for detecting the size of individual facets of an object or a three dimensional configuration thereof for purpose of the recognition and the detection of location of the object in which an object having irregular surface unevenness and presenting a complex external surface is disposed in front of the television camera in order to sense regions on the surface being photographed or a texture region thereof.

Of importance in such image processing is the detection of an edge of an object appearing on the screen. Where an accurate determination of the shape or size of the object is required, the center position of the edge or line must be determined very accurately. For example, two dimensional camera, for example, CCD camera, may be used to take the picture of the object, the camera having an array of 512 photoelectric transducer elements (hereafter referred to as pixels) in both x and y directions. If the pixels in the array are disposed at a pitch of Kp and the camera has a magnification of Kc, the pitch Kp of pixels in the array represents a length equal to Kp:Kc times the length of the actual object. A resolution higher than the pixel pitch Kp cannot be obtained from the pixel array, and thus the resolution of such determination is represented by Kp. Kc. This means that if the magnification of the camera Kc is high or the pixel pitch Kp is high, the accuracy of determination remains low. In addition, depending on the brightness of the illumination or the optical reflectivity of the surface of the object, the edge (line) may be blurred or thickened, causing a reduction in the accuracy with which the edge is sensed. Describing this more specifically with reference to FIG. 1, an object 3 may be photographed by CCD camera 2 to provide an image frame as shown in FIG. 2-(a). A single scan line includes a brightness signal, as depicted in FIG. 2-(b), indicating that the magnitude of the brightness signal rapidly changes at the edges of the object. When the brightness signal is subject to a digital conversion, the distribution of the brightness at the edge will be as shown in FIG. 2-(c). When a threshold SL1 as shown in FIG. 2-(c) is used to sense the edge of the object, the x position of the edge will be calculated to be at Ec11. If the threshold is changed to SL2, the x position of the edge will shift to Ec12. Thus it will be seen that the position where the edge is detected varies with the level of the threshold. In addition, when the threshold value SL3 is chosen, a slight variation in the brightness of the illumination may cause the x position of the edge to be detected at Ec11 at one time and at Ec12 at another, thus causing a variation in the edge position detected.

SUMMARY OF THE INVENTION

The invention has for its first object the detection of an edge position with a resolution higher than that determined by the pixel of image data, and has for its second object the reduction of an error in detecting the edge position which occurs depending on the environment such as the illumination in which image data is obtained.

Figure 4A:
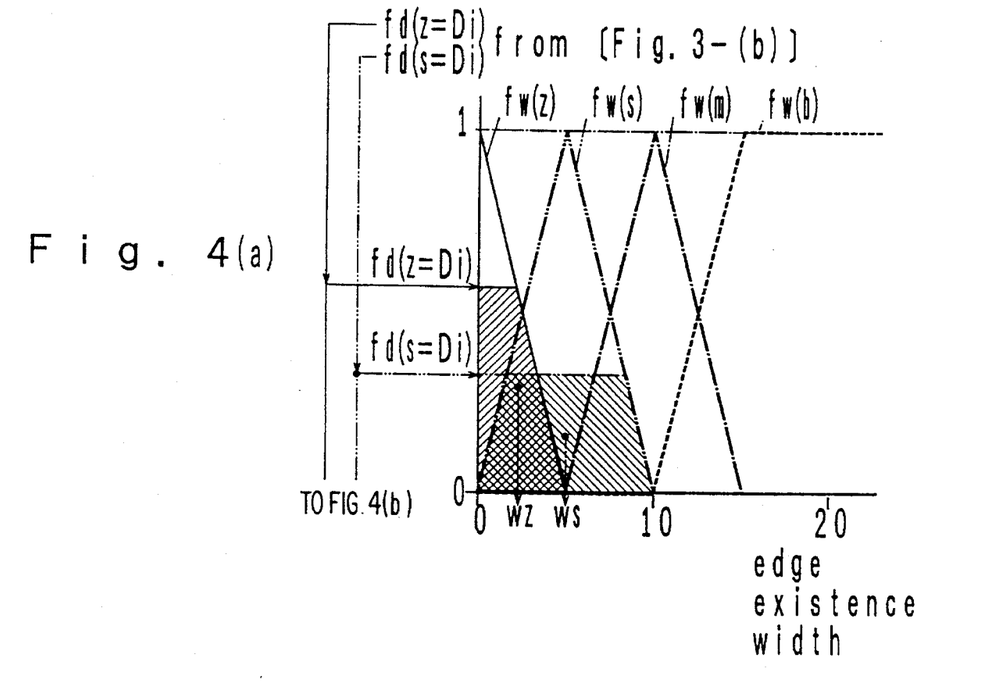
FIGS. 4(a)–4(b) graphically shows an edge existence width estimate function 4(a) which converts the membership value into a weight value, and an edge probability estimate function 4(b) which converts the membership value into a different weight value.

In accordance with the first aspect of the invention, an edge position on an image which is represented by image data indicating the brightness of individual picture elements distributed in two dimensions x, y is detected by the following steps:

A. a difference in the brightness between picture elements which are adjacent to each other in the x direction or a differential value (Di) is calculated;

B. considering an edge zone in which the differential value (Di) changes from 0 to another value and then returns to 0 in the x direction, picture elements (xi) in a selected region (xebl-xeel) have their differential values (Di) converted into various indices [fd(z), fd(s), fd(m), fd(b), fd(u)] meaning low, medium, high or the like;

C. for each of the picture elements (xi) in the selected region (xebl-xeel), each of the indices is converted into an edge existence width (wz, ws) in accordance with an edge existence width conversion function which corresponds to each index, thus calculating a resultant center value (Wwi) from the individual edge existence widths (wz, ws shown in FIG. 4-(a)); and D. the x position (xi) of each picture element in the selected region (xebl-xeel) is weighted by the reciprocal of the resultant center value (Wwi) to calculate a center value (Ejcpl) of an assemblage of weighted picture elements in the selected region (xebl-xeel), and the center value is defined as the edge center position. It is to be understood that reference characters and numerals appearing in parentheses designate elements appearing in an embodiment to be described later with reference to the drawings.

Figure 2A:
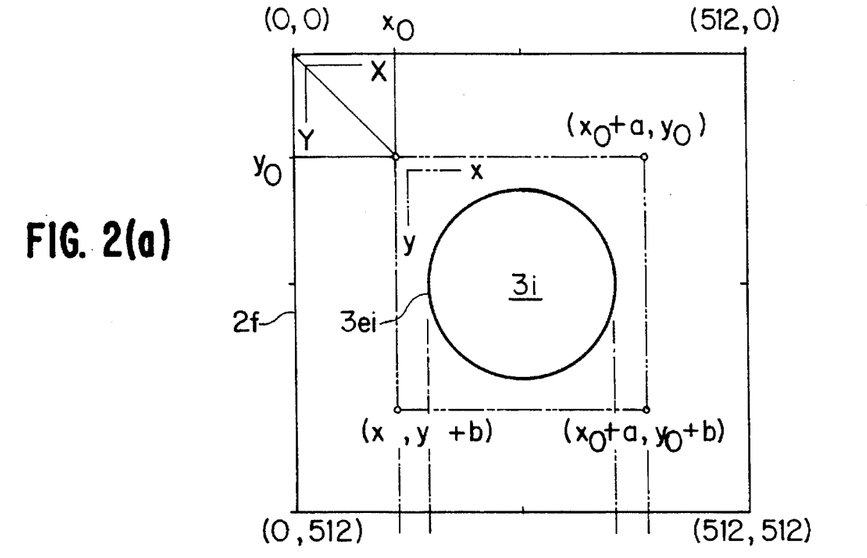
FIG. 2(a)–2(c) shows an image field 2(a) which is obtained by photographing with a camera 2 shown in FIG. 1, the distribution of brightness 2(b) on a scan line within an object region in the image field 2(a), and a change in the brightness 2(c) in a region of an edge 3ei of an object image 3i within the image field 2(a)
Figure 2B:
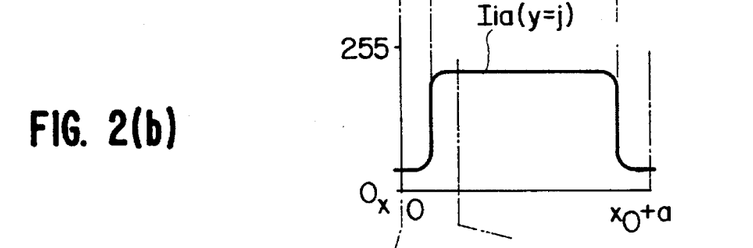
Figure 2C:
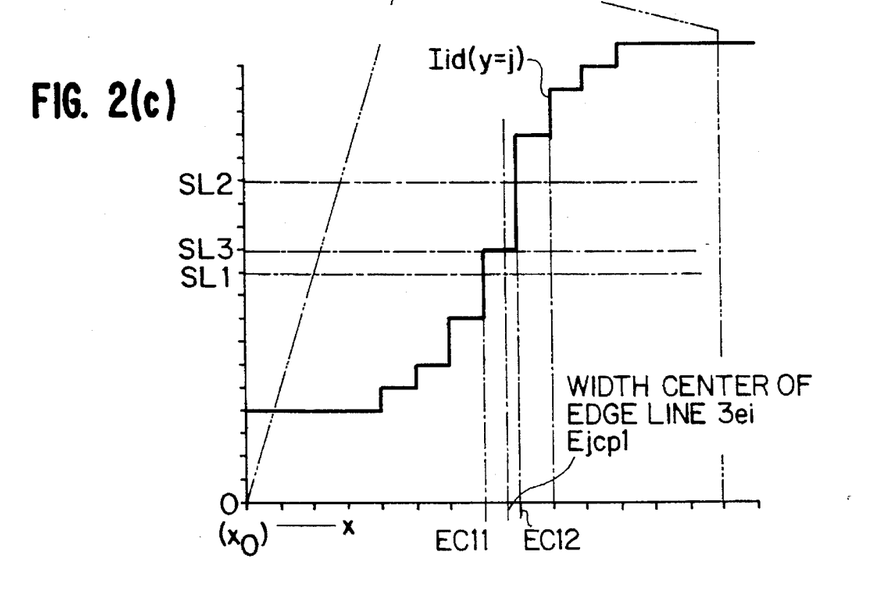
Figure 3A:
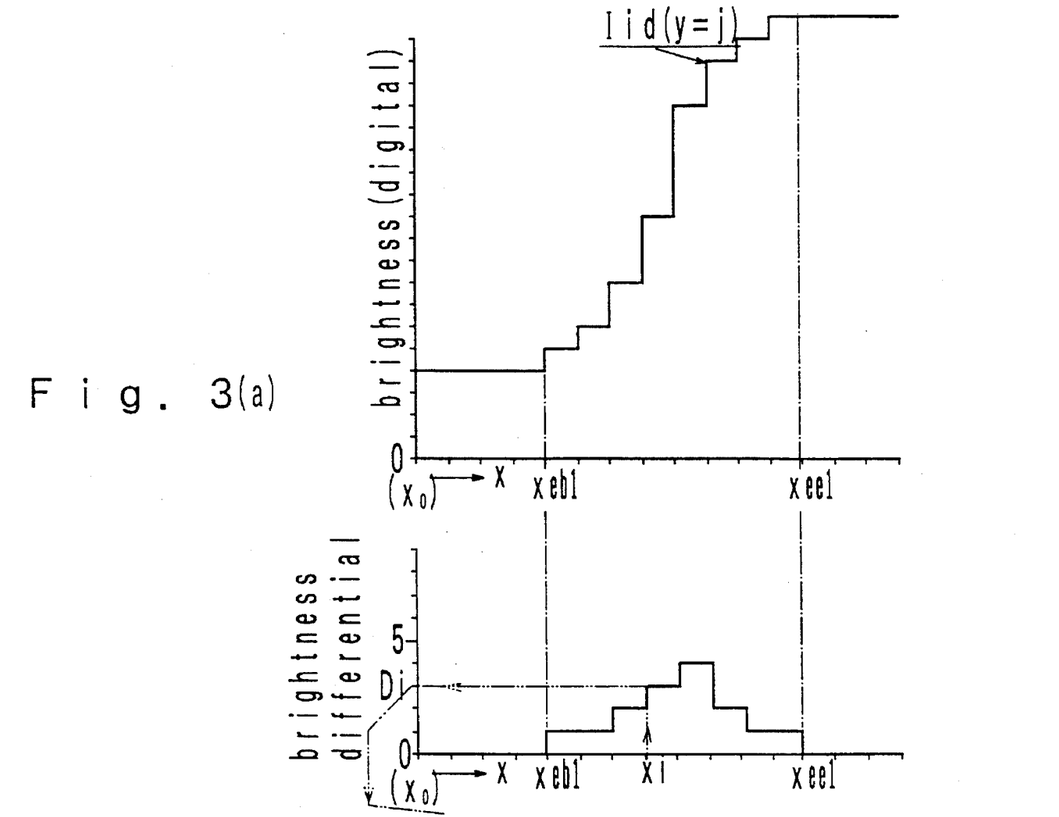
FIGS. 3(a)–3(b) graphically shows a brightness differential 3(a) between adjacent picture elements corresponding to the change in the brightness shown in FIG. 2, and an index function 3(b) which converts the brightness differential into a membership value.
Figure 3B:
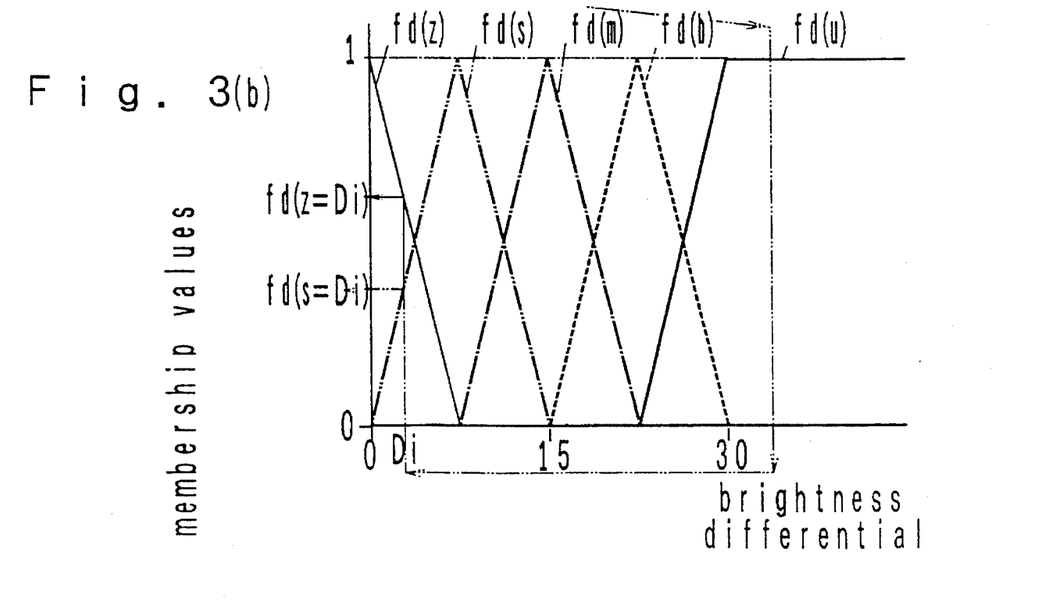

In accordance with this aspect of the invention, the processing of the paragraph A provides the differential value (Di) between adjacent picture elements in the x direction from image data for the edge region shown in FIG. 2-(c), and the differential value assumes a distribution as shown in FIG. 3-(a). Considering the distribution of the differential values, it will be noted that the edge exists in a zone in which the differential value changes from 0 to another value (either positive or negative; a positive change means a change from a low to a high brightness, and a negative change implies the reverse) and then returns to 0 again. The processing under the paragraph B converts the differential value (Di) of each picture element (xi) in the selected region (xebl-xeel), which is in turn located within such zone, into a value such as fd(z=Di), fd(s=Di), fd($m=Di$), fd(b=Di), fd(u=Di) which represents the degree that it belongs to each of indices which are fuzzy representations of the brightness, as shown in FIG. 3-(b). The processing under the paragraph C converts such value of each picture element (xi) into an edge existence width (wz, ws) in accordance with an edge existence width conversion function which corresponds to each index, and calculates a resultant center value (Wwi) of the edge existence widths (wz, ws), as shown in FIG. 4-(a). The resultant center value (Wwi) is obtained for each picture element (xi) (see FIG. 5-(a)). Specifically, it is presumed that for each picture element (xi), there is an edge in a range (xi±Wwi), which is within a width of Wwi from the position (xi). The processing under the paragraph D applies a weight, which is equal to the reciprocal of the resultant center value (Wwi), to the position of each picture element (xi) within the selected region (xebl-xeel), and calculates the center position (Ejcpl) in the x direction of the region (xebl-xeel). See the abscissa of FIG. 5-(b). In other words, a range in which the edge is likely to exist for each picture element (xi) is assembled over the entire region (xebl-xeel), and the center position (Ejcpl) in the x direction of the assemblage is defined as the center of the edge or line. Thus, x position (Ejcpl) is defined as an edge center. As a result of the processing under the paragraph D, a numerical value which represents the x position (Ejcpl) will include a fraction of a pixel pitch, whereby the edge center information (Ejcpl) will be obtained with a resolution higher than the pixel pitch. In addition, the differential value Di is little influenced by the brightness of the illumination, and accordingly, the processings under the paragraphs C and D, in particular, the center value of the assemblage obtained under the paragraph D is virtually immovable as the brightness of the illumination oscillates, thus allowing the edge center (Ejcpl) obtained to be free from error caused by the illumination.

Figure 4B:
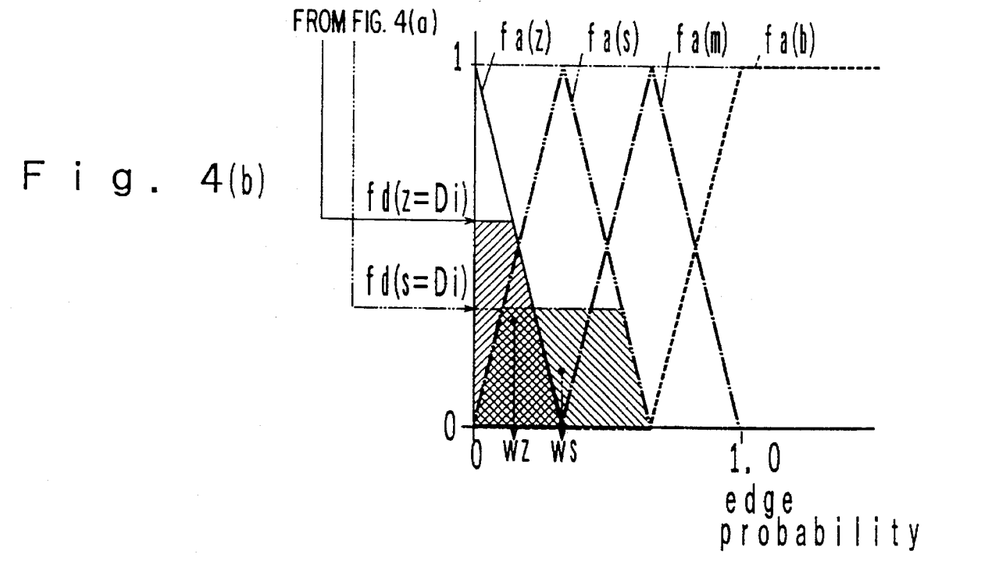

According to another aspect of the invention, an edge position on an image represented by image data indicating the brightness of individual picture elements distributed in the two dimensions x, y is detected by the following steps:

A. a difference in the brightness between picture elements which are adjacent to each other in the x direction or a differential value (Di) is calculated;

B. each of the picture elements (xi) located in a selected region (xebl-xeel) within an edge zone in the x direction in which the differential value (Di) changes from 0 to another value and then returns to 0 has its differential value (Di) converted into one of indices [fd(z), fd(s), fd(m), fd(b), fd(u)] each indicating a low, medium, high or like index;

c. for each of the picture elements (xi) in the selected region (xebl-xeel), the index obtained is converted into an edge probability (wz, ws as shown in FIG. 4 (b)) in accordance with an edge probability conversion function which corresponds to each of the indices, and a resultant center value (Wai) is calculated from the individual edge probabilities (wz, ws); and D'. the x position of each of the picture elements (xi) in the selected region (xebl-xeel) is weighted by the obtained resultant center value (Wai), and a center value (Ejcpl) is calculated from the assemblage of such weighted picture elements in the selected region (xebl-xeel), and this is defined as as edge center position.

Figures 5A, 5B:
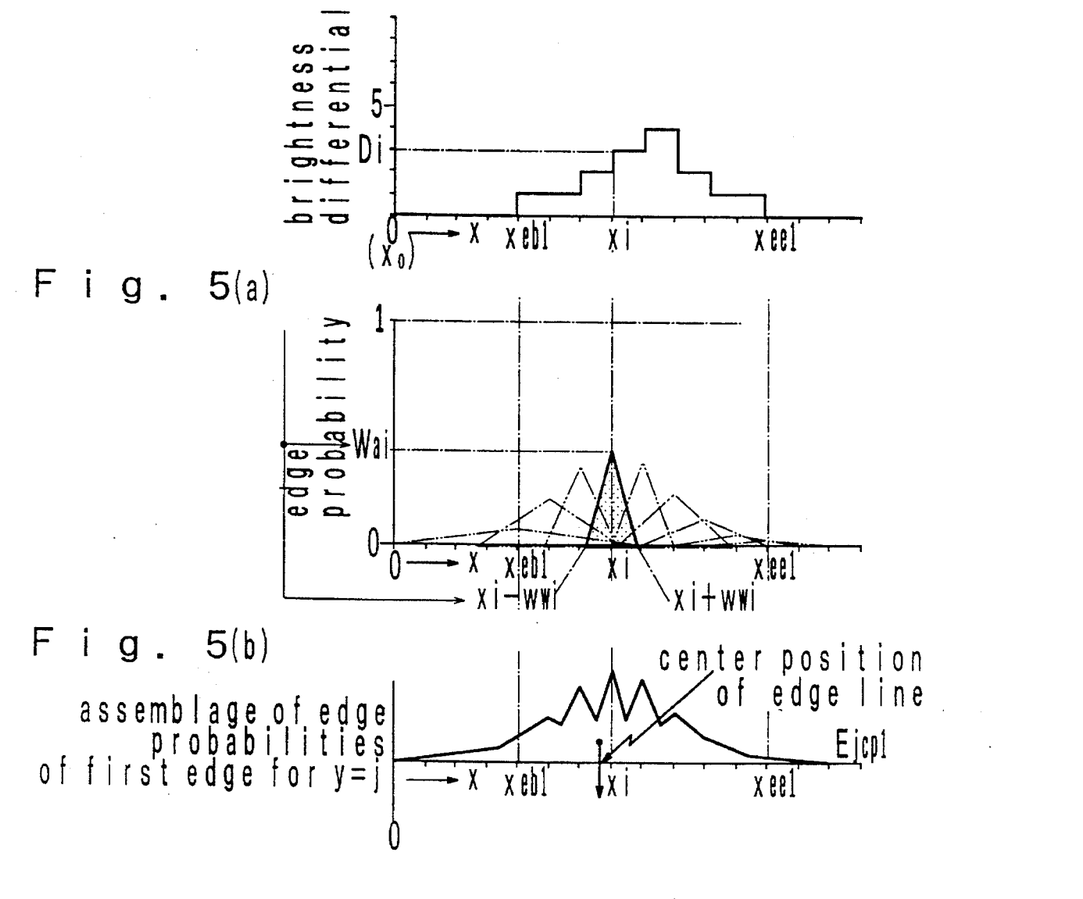
FIGS. 5(a)–5(b) graphically shows the weight of an estimation 5(a) that a particular picture element xi of an interest represents an edge center, in terms of a triangle shown in solid line which is defined by an edge existence width estimate calculated in accordance with the estimate function shown in FIG. 4 and an edge probability estimate calculated in accordance with the estimate function shown in FIG. 4, and FIG. 5 also graphically shows a contour of an assemblage of weights of estimations 5(b) that individual picture elements in the edge zone are an edge center.

According to this aspect of the invention, the processings under the paragraphs A and B are conducted similarly as before, and during the processing under the paragraph c, the index value such as fd(z=Di), fd(s=Di), fd(m=Di), fd(b=Di), fd(u=Di) of the respective picture elements (xi) is converted into an edge probability (wz, ws) in accordance with an edge probability conversion function which corresponds to each index, and a resultant center value (Wai) is calculated from these edge probabilities (wz, ws). The resultant center value (Wai) is obtained for each picture element (xi). See the ordinate of FIG. 5-(b). Specifically, it represents the probability that each picture element position (xi) is estimated to be an edge center. In the processing under the paragraph D, each picture element position (xi) in the selected region (xebl-xeel) is weighted by the resultant center value (Wai) to calculate the center position (Ejcpl) in the x direction of the region (xebl-xeel). See the abscissa of FIG. 5-(b). In this manner, the probabilities that the respective picture elements (xi) are an edge center are assembled together over the entire region (xebl-xeel), and the center position (Ejcpl) in the x direction of the assemblage is defined to be an edge center. A numerical value which represents the x position (Ejcpl) includes a fraction of the pixel pitch and accordingly information representing the edge center (Ejcpl) is obtained with a resolution higher than that of the pixel pitch. In addition, the differential value Di is little influenced by the brightness of the illumination, and accordingly, the processings under the paragraphs c and D, in particular, the center value of the assemblage obtained under the paragraph D remains virtually immovable as the brightness of the illumination oscillates, whereby information which is thus obtained to indicate an edge center (Ejcpl) is free from error caused by the illumination.

In a preferred embodiment of the invention, the both aspects of the invention mentioned above are combined together to detect an edge position on an image represented by image data indicating the brightness of individual picture elements distributed in two dimensions x, y, by the following steps:

A. a difference in the brightness between picture elements which are adjacent to each other in the x direction or a differential value (Di) is calculated;

B. a picture element (xi) in a selected region (xebl-xeel) which is located within an edge zone in the x direction, in which the differential value (Di) changes from 0 to another value and then returns to 0, has its differential value (Di) converted into one of indices. [fd(z), fd(s), fd(m), fd(b), fd(u)] each indicating a low, medium, high or like index;

C. for each picture element (xi) in the selected region (xebl-xeel), the index obtained is converted into an edge existence width (wz, ws) in accordance with an edge existence width conversion function which corresponds to each index, and a first resultant center value (Wwi) is calculated from the individual edge existence widths (wz, ws shown in FIG. 4-(a));

c. for each picture element (xi) in the selected region (xebl-xeel), the index obtained is converted into an edge probability (wz, ws shown in FIG. 4-(b)) in accordance with an edge probability conversion function which corresponds to each index, and a second resultant center value (Wai) is calculated from the individual edge probabilities (wz, ws); and d. The x position of the picture elements (xi) in the selected region (xebl-xeel) is weighted by the first and the second resultant center value (Wwi, Wai), respectively, and a center value (Ejcpl) is calculated from an assemblage of weighted picture elements in the selected region and is defined as an edge center position.

In the step d of the preferred embodiment, an assemblage of isosceles triangles (see FIG. 5-(a)) are formed, each triangle having a base of a length which is equal to twice the first resultant center value (Wwi) in the x direction which is centered about the respective x position of the picture elements in the selected regions (xebl-xeel) and having a height which is equivalent to the second resultant center value (Wai), and the x position (Ejcpl) of the center of gravity of a figure, shown in FIG. 5-(b) depicted by the outermost contour of the assemblage, is calculated and is defined to be an edge center position.

According to the preferred embodiment, the first resultant center value (Wwi) is defined by the resultant center value (Wwi) of the edge existence widths (wz, ws) obtained in the step C, and the second resultant center value (Wai) is formed by the resultant center value (Wai) of the edge probabilities (wz, ws) obtained in the step c. In the step d, the first and the second resultant center value (Wwi, Wai) are weighted to form an assemblage of picture element positions (xi) over the entire region (xebl-xeel), and the center position (Ejcpl) in the x direction of the assemblage is determined to be the edge center. The edge center information (Ejcpl) thus obtained exhibits a higher reliability.

Other objects and features of the invention will become apparent from the following description of an embodiment thereof with reference to the drawings.

DESCRIPTION OF PREFERRED EMBODIMENT

Figure 1:
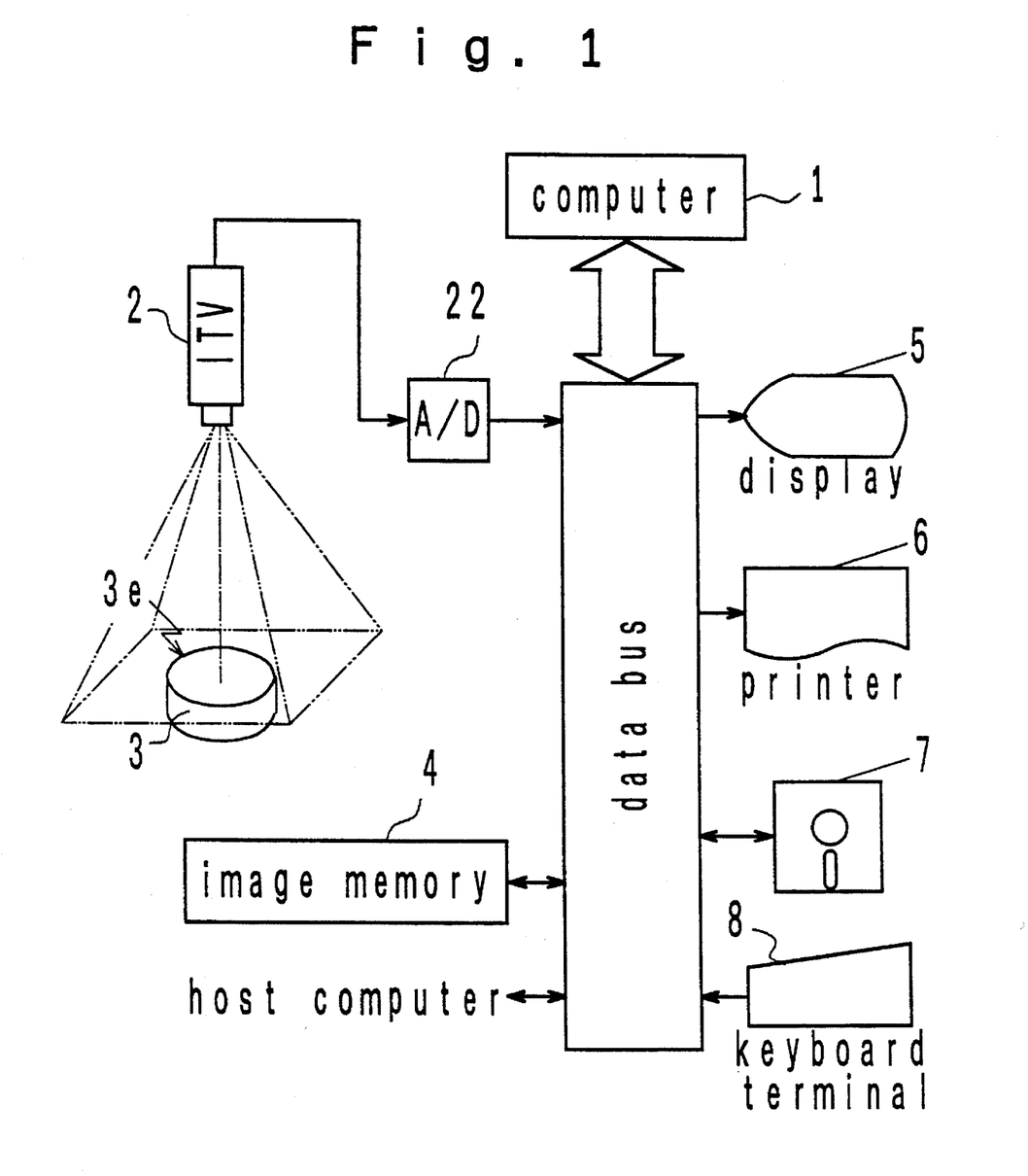
FIG. 1 is a block diagram of an apparatus for measuring the size of an object according to one embodiment of the invention.

FIG. 1 shows an apparatus for measuring a size, which comprises a computer 1, a television camera 2, an image memory 4, a display 5, a printer 6, a floppy disc unit 7 and a keyboard terminal 8. The camera 2 represents an ITV camera (or CCD camera) which takes a picture of an object 3 and delivers an analog image signal in the form of an array of 512×512 picture elements. The image signal is fed to A/D converter 22 which converts it into a digital data of a gray scale having 256 steps per picture element.

The image memory 4 shown in FIG. 1 is freely accessible for read-write operation, and stores a variety of processing data as well as an original image data. The display unit 5 and the printer 6 are used to display or print out a result of processing performed by the computer 1 while the floppy disc unit 7 is used to store such result. The keyboard terminal 8 is provided so as to be operated by an operator for entry of various commands and data. The computer 1 is connected to a host computer, not shown, and responds to a command or data fed therefrom or a command or data inputted through the keyboard terminal 8 by causing the television camera to take a picture of the object 3, by calculating the center position of an edge 3e (edge line) of the object 3 appearing upon the resulting image field, by feeding an edge image which is developed to an enlarged scale to the image memory 4 so that the edge image is depicted therein with a higher resolution than the resolution of the camera 2, by displaying it on the display 5 and by calculating the size of the object 3 on the basis of the edge image to be delivered as an output.

Figure 6:
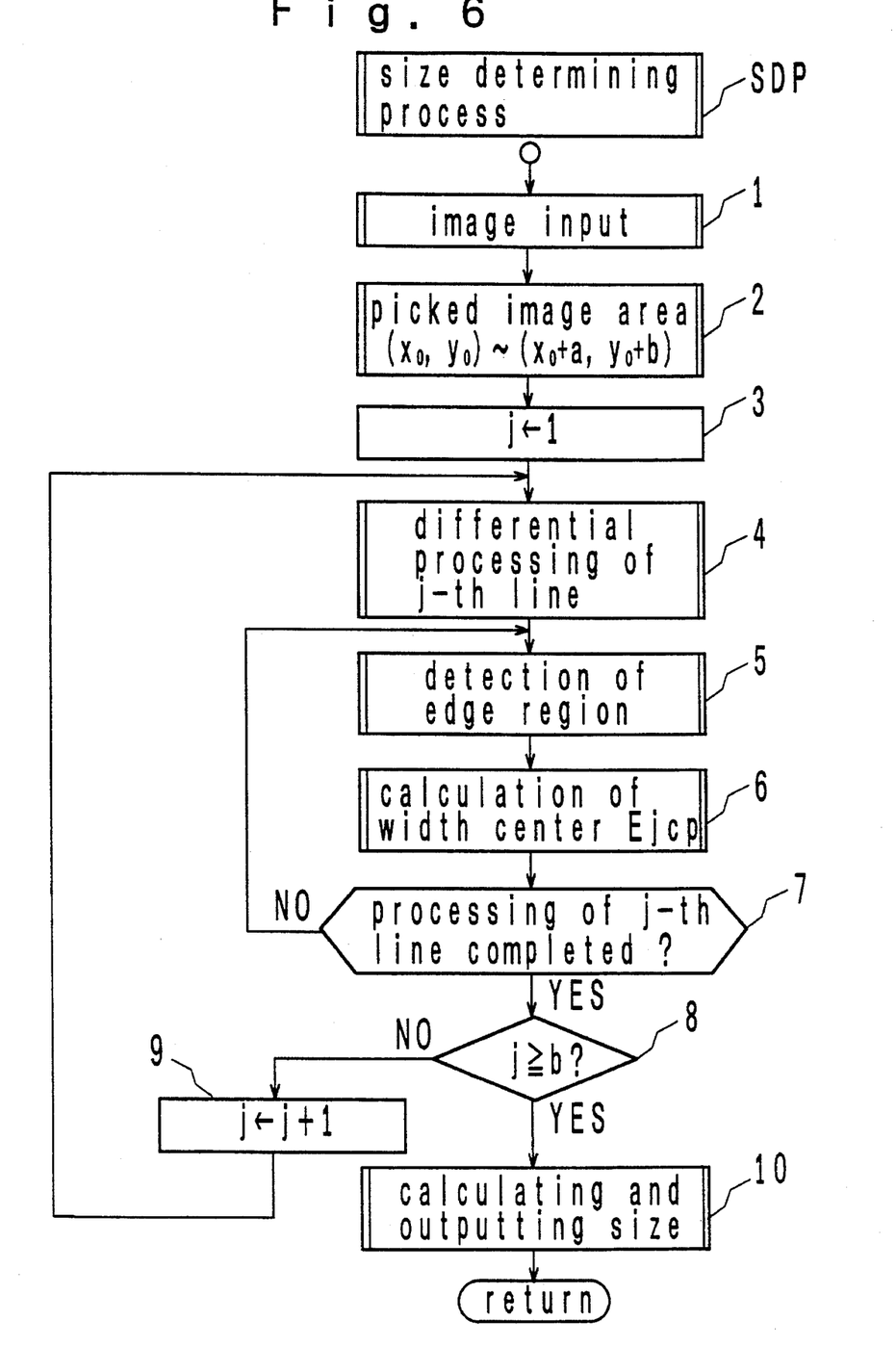
FIG. 6 is a flow chart showing part of a processing operation performed by a computer 1 shown in FIG. 1.

Referring to FIG. 6, there is shown a summary of a size determining processing program SDP which is performed by the computer 1. During this program, the computer 1 initially causes a picture signal corresponding to one image field taken by the camera 2 to be fed to A/D converter 22, which converts the picture signal into an image data of gray scale having steps 0 to 255, which is in turn written into an original image area (X, Y coordinates) in the memory 4. (This will be referred to as a subroutine 1, and in the description to follow, such a subroutine or step will be indicated by a numeral shown in parenthesis.) An image which is written into the original image area is shown in FIG. 2-(a). The computer 1 then operates to detect an object existing area (a rectangle denoted by the dotted line inside an outer rectangle shown in FIG. 2-(a), and which is defined by four corners defined by coordinates X=$x_0$, Y=$y_0$, X=$x_0$+a and Y=$y_0$+b) from the original image area. Image data corresponding to this area is read out of the original image area of the memory 4 and is written into a memory area within the memory 4 for an image data to be processed (which will be hereafter referred to as a picked data area having its original 0, 0 of x, y coordinates at X=$x_0$ and Y=$y_0$ of the original image area) (2).

Image data on a j-th line (y=j) in the picked data area is subject to a differential processing (4). j=1 represents the first line to be processed. The differential processing proceeds in the x direction or from left to right as viewed in FIG. 2-(a), and during this processing, image data I(i−1) of a picture element x(i−1) which precedes a particular picture element xi of an interest or located immediately to the left thereof is subtracted from image data Ii (a digital value representing the brightness) of the picture element xi. In other words, a differential value of the particular picture element xi is given by Di=Ii−I(i−1). As shown in FIG. 2-(a), where the background represents a low brightness level while the object 3 exhibits a high brightness level, the brightness of the first line will be distributed as shown in FIG. 2-(b), and in an edge zone which represents a boundary between the background and the object 3, image data exhibits a change as shown in FIG. 2-(c). It will be noted that in the edge zone, image data rapidly changes from a low brightness to a high brightness or conversely. In FIG. 2-(c), the abscissa represents aligned picture elements with one gradation representing a single picture element while the ordinate represents the brightness of a picture element, with one gradation representing one of steps 0 to 255. In FIG. 3-(a), the graph of the brightness distribution of the edge region (as shown in FIG. 2-(c)) is shown in conjunction with a graph of the brightness differential distribution in order to show the relationship between the brightness distribution I(i) and the brightness differential distribution (differential value D(i)). Upon entering the edge zone, the differential value Di changes from 0 to either positive or negative value, and upon leaving the edge zone, the differential value Di returns to 0. The computer 1 recognizes such changes, and by examining the distribution of differential values along one scan line which continues in the x direction, it detects an edge region xebl-xeel (5). Upon detecting an edge region, the computer 1 then proceeds to calculate an edge center position Ejcpl (see FIGS. 2 and 5) in the x direction within this region, and writes the calculated value Ejcpl into an enlarged data memory area within the memory 4 in a manner corresponding to the line number j (6). The detail of calculation of the center position Ejcpl will be described later with reference to FIG. 7. When this calculation has been completed, the computer then proceeds to detecting a next edge region and then calculates a next edge center position. When one scan line has been processed in this manner, the line number is updated (7-9), repeating the similar processing for the updated line. Upon completion of processing the final line (y=j=b), the edge image of the object 3 is developed into a high resolution image memory disposed within the display 5 on the basis of the center position data stored in the enlarged data memory area, for display on the display 5. At the same time, the size of the edge image is calculated, and the calculated size data as well as image data in the high resolution image memory are delivered to the display 5, the printer 6, the floppy disc unit 7 and/or host computer (10).

Figure 7:
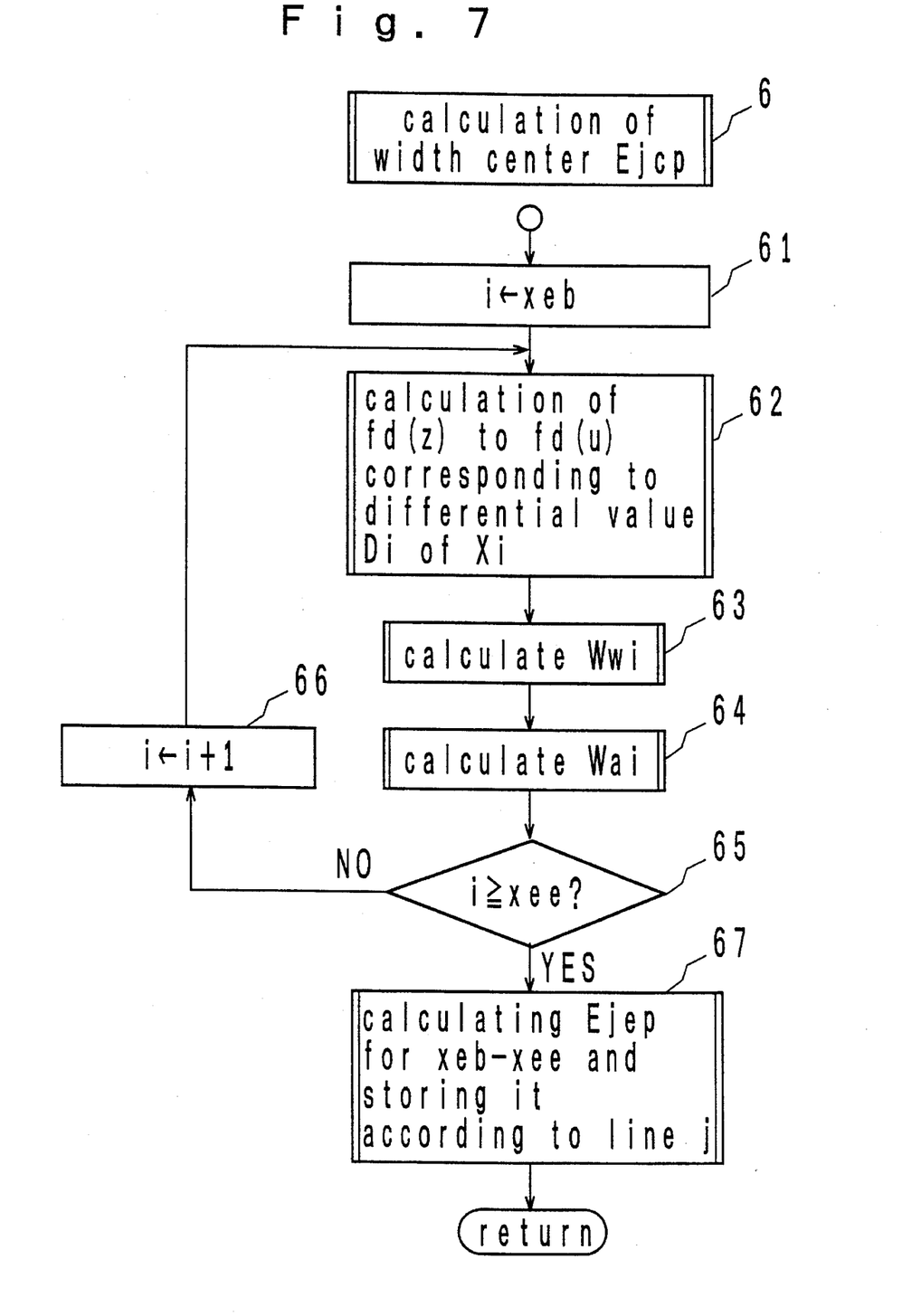
FIG. 7 is a flow chart illustrating the detail of "calculation of width center Ejcp" routine (6) shown in FIG. 6.

The detail of the "calculation of center position Ejcpl" subroutine (6) shown in FIG. 6 will now be described with reference to FIG. 7. In the present embodiment, a region for detecting the edge center is defined from a picture element xebl where the differential value Di changed from 0 to another value to a different picture element xeel, beyond which the differential value returns to 0, as shown in FIG. 3-(a).

When calculating the center position Ejcpl (6), a particular picture element of interest is chosen to be as a picture element xebl located at the beginning (or the left end) of this region (61), and the differential value Di (or more strictly, the absolute value thereof) of the picture element xi=xebl is converted into a function value fd(z=Di), fd(s=Di), fd(m=Di), fd(b=Di) and fd(u=Di), each of which represents the degree to which such absolute value belongs to one of indices:zero (z), small (s), medium (m), high (b) and specially high (u) (62). A conversion function or membership function is shown in FIG. 3-(b). In the example shown, Di=3, and accordingly, fd(m=Di), fd(b=Di) and fd(u=Di) are all equal to 0 (zero). The computer 1 then converts the index values [fd(z=Di), fd(s=Di) ] into edge existence widths (wz,ws) (or more strictly, an estimate thereof such as wz, ws shown in FIG. 4-(a)). The edge existence widths (wz, Ws) are converted in accordance with an edge existence width estimate function which corresponds to an index (which is z and s in the example shown) having a value exceeding 0. The edge existence width estimate function then calculates a resultant edge existence width (Wwi) from edge existence widths (wz,ws) thus obtained (63). FIG. 4-(a) shows the functions fw(z), fw(s), fw(m) and fw(b) which are used in this calculation. It should be noted that each of the functions represents a function which defines an area. For example, a function value fd(z=Di), which representing the degree that a differential value Di belongs to the index (z), is converted into an abscissa position wz of the center of gravity of an area, located below an ordinate value fd(z=Di) of a figure which is defined by the function fw(z) and the ordinate and the abscissa. The function value fd(s=Di) representing a degree that a differential value Di belongs to the index (s) is converted into an abscissa position ws of the center of gravity of an area, located below an ordinate value fd(s=Di), of a figure defined by the function fw(s) and the ordinate and the abscissa. A resultant center of gravity of these center positions wz and ws is denoted as Wwi. The abscissa indicates an edge existence width estimate, and Wwi indicates how far the edge region extends from the particular picture element xi of interest.

The computer 1 then converts the index values [fd(z=Di), fd(s=Di)] into edge probabilities (such as wz, ws shown in FIG. 4-(b)) in accordance with an edge probability estimate function which is provided corresponds to an index (such as z, s in the example shown) having a value exceeding 0. The edge probability estimate function then calculates a resultant edge probability (Wai) from these edge probabilities (64). FIG. 4-(b) shows the functions fa(z), fa(s), fa(m) and fa(b) which are used in this calculation. Each of the functions is a function which defines an area. For example, a function value fd(z=Di), which represents the degree that the differential value Di belongs to the index (z), is converted into an abscissa position wz of the center of of gravity of an area, located below an ordinate value fd(z=Di) of a figure defined by the function fd(z) and the ordinate and the abscissa. A function value fd(s=Di), which represent the a degree that the differential value Di belongs to the index (s), is converted into an abscissa position ws of the center of gravity of an area, located below an ordinate value fd(s=Di), of a figure defined by the function fd(s) and the ordinate and the abscissa. Wai represents a resultant center of gravity formed from these center of gravity positions wz and ws. The abscissa indicates an edge probability estimate, and Wai indicates a probability that the particular picture element xi of interest is an edge center.

In this manner, the computer 1 calculates the edge existence width estimates Wwi and the edge probabilities Wai for all the picture elements xi in the region xebl to xeel (62 to 66).

The computer 1 then forms a triangle for each of the picture elements xi in the region xebl to xeel having a base located on the abscissa and having a length equal to an extension Wwi of the edge region as centered with respect to the x position of the picture element xi and having a height, taken on the ordinate, which is equal to the edge center probability Wai. All of these triangles are depicted on a common plane having the x position on the abscissa and the edge probability on the ordinate, as indicated by a triangle shown by the solid line and triangles shown by the dotted lines in FIG. 5-(a). For convenience, the brightness differential distribution graph as shown in FIG. 3(a) has been reproduced in FIG. 5-(a) to show the relationship between the values of the differential distribution graph and the values of the various probability triangles. The computer then calculates the x position Ejcpl of the center of gravity of a figure as shown in FIG. 5-(b) which is defined by a contour line covering all the triangles and the abscissa. This position Ejcpl is the center in the x direction of the edge region xebl to xeel or the center position in the x direction of the edge line. Having calculated the x position data Ejcpl, the computer 1 writes the x position data Ejcpl into a register in the enlarged data memory area within the memory 4 which is assigned to the line number j (67).

In this manner, the center position (in the x direction) of the edge line of the first edge region, as indicated by xebl to xeel shown in FIG. 3-(a), of the line number j has been determined. The computer 1 then completes the calculation of the edge center Ejcp (6 shown in FIG. 6 and its detail shown in FIG. 7), and then undergoes a check step 7 shown in FIG. 6 and then returns to the subroutine 5 where the second edge region of the j-th line is detected. Upon detecting the edge region in this manner, the edge center Ejcp is calculated (6 in FIG. 6 and its detail shown in FIG. 7). When the detection of the edge region and the calculation of the edge center Ejcp for the detected region have been completed for the j-th line, the computer proceeds to the differential processing of the next line (7 to 9 and then 4 shown in FIG. 6), thus detecting the edge region of the next line and calculating the edge center Ejcp of the detected region (5 to 7 in FIG. 6). When such processing has been completed for the final line (y=j=b), the computer 1 has completed the detection of the center position for the edge line 3ei of the object 3i appearing on the image field (FIG. 2).

It will be seen that a change in the image data (brightness data) is high in the edge region, or alternatively, its differential value Di, namely, a difference in the brightness between adjacent picture elements in both x and y directions, is high in absolute magnitude. Accordingly, there is a high probability that the position (for the brevity of description, the position in the x direction only will be considered) where the differential value Di or its absolute magnitude is highest represents an edge center. From this standpoint, function values fd(z=Di), fd(s=Di), fd(m=Di), fd(b=Di) and fd(u=Di) associated with the indices "0" (z), "small" (s), "medium" (m), "high" (b) and "specially high" (u) are chosen such as the greater the differential value Di becomes greater, the value of the function fd(u=Di) associated with the "specially high" index (u) becomes greater. Since it is likely that an edge exists around a picture element having a greater value of the differential value Di, the edge existence width estimate functions fw(z), fw(s), fw(m) and fw(b) shown in FIG. 4-(a) are chosen to have smaller edge existence width estimate (centers of gravity wz, ws and the like) for a greater magnitude of the differential value Di. On the other hand, in order that a greater weight be imparted to the position of a picture element having a greater magnitude of the differential value Di, the edge probability estimate functions fa(z), fa(s), fa(m) and fa(b) are given a greater edge probability estimate (centers of gravities wz, ws and the like).

The center of gravity Wwi of the assemblage of the edge existence width estimates shown in FIG. 4-(a) represents a first weighting factor for the likelihood that the picture element position xi represents an edge center while the center of gravity Wai of the assemblage of the edge probability estimates shown in FIG. 4-(b) represents a second weighting factor for the likelihood that the picture element position xi is an edge center. The center of gravity of a triangle (shown in solid line) for each picture element xi in FIG. 5-(a) is a composite of the first and the second weighting factors Wwi and Wai (i.e. the weight applied to a particular picture element xi within the selected region xebl to xeel). Since there is only one edge center, a position representing the center of gravity of the assemblage of such weights over all the picture elements can be determined to be an edge center. In the described embodiment, the contour shown in FIG. 5-(b) representing the assemblage of triangles for individual picture elements shown in FIG. 5-(a) in solid line and dotted lines and the x-axis define a figure having its center of gravity at the abscissa position or x position Ejcpl, which is determined to be an edge center.

While a preferred embodiment of the invention has been illustrated and described, it is to be understood that there is no intention to limit the invention to the precise construction disclosed herein and the right is reserved to all changes and modifications coming within the scope of the invention as defined in the appended claims.

What is claimed is:

1. An apparatus for detecting an edge center of an object comprising:

camera means for taking a picture of the object and generating an analog image signal which represents a brightness of an image on individual picture elements, wherein the individual picture elements form a two dimensional matrix with an x dimension and a y dimension;

an A/D converter for converting the analog image signal to digital image data according to a gray scale;

memory means for storing at least the digital image data;

means for calculating differential data which corresponds to the digital image data between each of the individual picture elements which are adjacent to each other in a direction of the x dimension;

means for converting the differential data corresponding to each of the individual picture elements that are located in a selected region within an edge zone defined in the direction of the x dimension into an index value for each of a plurality of indices such as small, medium and high;

means for converting each index value for each of the individual picture elements that are located in the selected region into at least one edge value and calculating at least one preliminary resultant center position from at least one of the edge values; and means for weighing an x position of the x dimension of each of the individual picture elements in the selected region based on at least one of the preliminary resultant center positions and calculating a subsequent center position based on the weighted x positions of the individual picture elements in the selected region, wherein the subsequent center position is the edge center of the object in the x dimension.

2. An apparatus for detecting an edge center of an object as claimed in claim 1, wherein:

the means for converting each index value converts each index value into an edge existence width in accordance with an edge existence width conversion function, wherein a separate edge existence width conversion function is provided for each of the indices, and calculates a first resultant center position of the edge existence widths; and the means for weighing the x position weighs the x position of each of the individual picture elements by applying the reciprocal of the first resultant center position to the x position of each of the individual picture elements in the selected region and calculates the subsequent center position based on the weighted x positions of the individual picture elements in the selected region, wherein the subsequent center position is the edge center of the object in the x dimension.

3. An apparatus for detecting an edge center of an object as claimed in claim 1, wherein:

the means for converting each index value converts each index value into an edge probability in accordance with an edge probability conversion function, wherein a separate edge probability conversion function is provided for each of the indices, and calculates a second resultant center position of the edge probabilities; and the means for weighing the x position weighs the x position of each of the individual picture elements by applying the second resultant center position to the x position of each of the individual picture elements in the selected region and calculates the subsequent center position based on the weighted x positions of the individual picture elements in the selected region, wherein the subsequent center position is the edge center of the object in the x dimension.

4. An apparatus for detecting an edge center of an object as claimed in claim 1, wherein:

the means for converting each index value converts each index value into an edge existence width in accordance with an edge existence width conversion function, wherein a separate edge existence width conversion function is provided for each of the indices, and also converts each index value into an edge probability in accordance with an edge probability conversion function, wherein a separate edge probability conversion function is provided for each of the indices, and calculates a first resultant center position of the edge existence widths and a second resultant center position of the edge probabilities; and the means for weighing the x position weighs the x position of each of the individual picture elements by applying the first resultant center position and the second resultant center position to the x position of each of the individual picture elements in the selected region and calculates the subsequent center position of the weighted x positions of the individual picture elements in the selected region, wherein the subsequent center position is the edge center of the object in the x dimension.

5. An apparatus for detecting an edge of an object according to claim 4, wherein the means for weighing the x position forms a triangle for each individual picture element in the selected region, wherein the triangle comprises a base having a length equal to twice the first resultant center position, which extends along the x direction of the x dimension and is centered about the x position of the individual picture element to which the triangle corresponds, and comprises a height which is equivalent to the second resultant center position, and wherein the means for weighing calculates, as the subsequent center position, an x position of the center of gravity of a figure which is represented by a contour of an assemblage of all of the triangles formed for all of the individual picture elements in the selected region.

* * * * *